United States Patent Office
3,658,762
Patented Apr. 25, 1972

3,658,762
PREPARATION OF NONCELLULAR POLY-
URETHANE COMPOSITIONS
David Stanley Cobbledick, Kent, Ohio, assignor to Allied
Chemical Corporation, New York, N.Y.
No Drawing. Filed May 28, 1970, Ser. No. 41,642
Int. Cl. C08g 22/34, 51/04; C09k 3/00
U.S. Cl. 260—77.5 AB            20 Claims

ABSTRACT OF THE DISCLOSURE

Improved preparation of noncellular polyurethanes by liquid phase reaction of an organic polyisocyanate and organic polyol in the presence of a mercuric carboxylic acid salt which is devoid of mercury bound directly to carbon and which is promoted by a basic plumbous salt of a neoacid. The improved process provides polyurethanes incorporating the promoted catalyst which are stable to hot water and are useful as coatings, caulks and sealants for cloth, leather, paper and ceramics.

BACKGROUND OF THE INVENTION

Field of the invention

The present invention relates to an improvement in the preparation of urethane polymers, more particularly of noncellular polyurethanes. It is especially concerned with an improved process for such urethanes which provides products of excellent stability toward hot water.

Description of the prior art

It is known to gel and cure liquid mixtures of organic polyisocyanates and polyols under ambient conditions of pressure and temperature for example 15–40° C., in the presence of dissolved salts such as divalent lead and mercury carboxylates as catalysts for urethane formation as disclosed in Brit. Pats. 901,056 and 997,369 and U.S. Pat. 3,201,136. Use of ambient conditions in effecting urethane-formation in the presence of these catalysts has permitted in situ production of completely reacted, stable noncellular urethanes on cloth, leather, paper and ceramics. A particularly important application of such compositions is as filled elastomeric sealant and caulks for ceramic sewer pipes.

These known catalyzed urethane systems suffer from several disadvantages which limit their utility.

For example, the aforementioned plumbous carboxylate catalysts are deactivated on contact with as little as about 0.1 percent water (based on the weight of the urethane), an amount generally present at the site of urethane application or adsorbed on the added filler. Moisture deactivation of the lead catalyst causes the urethane-forming composition to gel at an undesirably slow rate (as is illustrated in Table 2 of D. S. Cobbledick et al. U.S. Pat. 3,395,108) and in extreme cases permits the gas-forming side reaction of water and isocyanate to proceed to an undesirable extent yielding cellular or porus products as disclosed in Can. Pat. 720,528. On the other hand, urethane systems utilizing mercuric carboxylate catalysts such as mercuric acetate, which are relatively insensitive to moisture, gel and/or cure at an undesirably slow rate (as is illustrated in aforementioned U.S. Pat. 3,395,108, Table 1, Mixture 1, and in Example 6 below).

In addition to the foregoing disadvantages, the cured urethanes of the foregoing processes, albeit stable to water at ordinary temperatures, exhibit poor stability on contact with hot water.

Thus on relatively brief contact with hot water, particularly water at temperatures of about 60° C. or higher, the known cured urethane compositions deteriorate to soft useless masses.

According to aforementioned U.S. Pat. 3,395,108, the foregoing problems of moisture deactivation and low catalyst activity during urethane formation are overcome by employing a soluble mercuric carboxylic acid salt catalyst in the presence of an alkaline promoter, such as sodium, zinc, divalent lead oxides, hydroxides, carbonates, or basic carboxylates, still preferably alkaline earth metal oxides. However, cured urethanes incorporating the specific promoted catalysts of U.S. Pat. 3,395,108 are also of relatively poor stability toward hot water.

It is the object of the present invention to provide noncellular urethane compositions which possess excellent stability to hot water, and a method for preparing the same.

These and other objects and advantages will be apparent from the following description of the invention.

SUMMARY OF THE INVENTION

According to the invention, the above objects are attained, and the aforementioned disadvantages of the prior art processes are overcome, by preparing non-cellular polyurethanes by liquid phase reaction of an organic polyisocyanate and an organic polyol at ambient temperature and pressure in the presence of dissolved mercuric carboxylate catalyst promoted with a basic plumbous carboxylate. The catalyst is a mercuric carboxylic acid salt which is devoid of mercury bound directly to carbon. The promoter is a basic plumbous salt of a carboxylic acid having a carbon atom attached to a carboxylic acid group and bound by single covalent bonds to each of four carbon atoms. For the sake of brevity, the latter class of carboxylic acids are hereinafter designated neoacids.

The invention also includes the novel hot water-stable noncellular urethane products of the present process as well as the polyol-catalyst mixtures which conveniently serve as precursors of these products.

DETAILED DESCRIPTION OF THE INVENTION AND THE PREFERRED EMBODIMENTS THEREOF

Urethane formation according to the invention is characterized by rapid gelation and curing at ambient temperature and pressure. In other words, urethane compositions containing the plumbous salt promoted mercuric catalysts prescribed by the invention solidify and reach a relatively high degree of their ultimate hardness quickly. The resultant cured noncellular polymers which incorporate the promoted catalyst retain as much as 55 to 75% or more of their initial hardness after immersion in water at 60° C. or higher temperatures for 30 days or longer. The latter result was highly surprising in view of the poor hot water stability of cured urethanes prepared employing a mercuric carboxylate catalyst other than that of the present invention, for example an organomercuric carboxylate as is illustrated by Example 4 below, and/or employing the alkaline promoted mercuric catalysts of aforementioned U.S. Pat. 3,395,108, as is illustrated in Examples 3 and 5 below. The prior art cured urethanes are converted to objectionably soft materials retaining only about 9 to 36% of the original hardness after exposure to hot water for periods as brief as one week.

Urethanes are prepared in accordance with the invention by commingling, advantageously with agitation, a polyol or mixture of polyols and an organic polyisocyanate or mixture of organic polyisocyanates under at least ambient conditions of temperature and pressure in the presence of the mercuric and plumbous additives according to reaction techniques which are conventional in this art. Advantageously the mercuric and basic divalent lead salt additive of the invention are dissolved in the urethane forming mixture and are conveniently charged thereto as solutions in the polyol component. Preferably the invention is directed to preparation of urethane elastomers containing filler which is advantageously charged to the reaction as a dispersion in the polyol reactant. These filled urethane compositions have particular utility as sealants for ceramics such as clay sewer pipes designed to convey hot aqueous liquid streams.

The amount of mercuric salt catalyst charged according to the invention can vary over a wide range. Amounts of as little as about 0.01 weight percent, based on the weight of polyol charged, substantially accelerate the polyol-isocyanate reaction. Amounts of 5 weight percent or more can be employed. Preferably about 0.01 to 2 weight percent of the mercuric salt are charged. The optimum proportion of the mercuric salt catalyst will depend upon the particular salt used as well as upon the particular components and conditions employed.

The basic plumbous neoacid salt charged to the urethane forming reaction mass according to the invention not only provides hot water-stable noncellular urethanes but also acts as a promoter in the reaction of the polyol and the polyisocyanates in accordance with aforementioned U.S. Pat. 3,395,108. In general amounts of basic plumbous neoacid salt corresponding to at least about 0.05% and preferably about 0.08 to 0.2% by weight lead based on the weight of the organic polyol are employed to provide urethanes of the invention. Use of amounts of basic plumbous neoacid salt corresponding to more than about 2 weight percent lead based on the weight of the organic polyol, while not harmful, is generally wasteful of the reagent. In preparation of filled noncellular urethanes according to a preferred embodiment of the invention, the foregoing amounts of basic lead neoacid salt provide a pH greater than 6.5 for the mixture of polyol, filler, mercuric catalyst and basic lead promoter in accordance with the aforementioned U.S. Pat. 3,395,108.

The mercury salt charged as catalyst in the present invention can be divalent mercury carboxylic acid salt which is devoid of mercury to carbon linkages. As examples of suitable mercuric carboxylates the following are mentioned:

mercuric formate
mercuric acetate
mercuric propionate
mercuric isobutyrate
mercuric octoate
mercuric oleate
mercuric palmitate
mercuric stearate
mercuric oxalate
mercuric adipate
mercuric benzoate
mercuric hexahydrobenzoate
mercuric 2,2-dimethyl valerate
mercuric 2,2-diethyl butyrate
mercuric abietate
mercuric o-, m- and p-toluates
mercuric o-, m- and p-bromobenzoate
mercuric chloroacetate
mercuric p-nitrobenzoate In this respect also can be used mixtures of these and equivalent mercuric salts of other carboxylic acids including other homo-, hetero-, mono- and polycyclic aromatic, saturated and unsaturated aliphatic and cycloaliphatic carboxylic acids which may be further substituted with conventional inert substituents such as halogen, nitro and the like. Preferably I employ a mercuric salt of a nonaromatic carboxylic acid of 1 to 20 carbon atoms and especially of an alkanoic acid of one to six carbon atoms, such as mercuric acetate.

Basic plumbous salts suitable for use in the present invention are salts of aliphatic and cycloaliphatic carboxylic acids which are designated neoacids to denote the presence of a carbon attached to carboxylic acid group and bound by a single covalent bond to each of four carbon atoms. They can be prepared in conventional fashion for example by reaction of plumbous oxide with less than the amount of neoacid required to form the neutral divalent lead salt. Less conveniently the latter neutral divalent lead neoacid salts made basic by admixture with plumbous oxide or with a Group I-A metal oxide or hydroxide can be employed as the basic lead additive of the invention. Basic divalent lead salts of the following neoacids are representative examples of suitable lead additives:

pivalic acid
α-ethyl cyclopentyl carboxylic acid
dimethyl malonic acid
α-ethyl α-methyl phenyl acetic acid
α,α-dimethyl cyclohexaneacetic acid
2,2-dimethyl valeric acid
2,2-dimethyl octanoic acid
2,2-dimethyl undecanoic acid
2,2-diethyl butyric acid
2,2,3,3-tetramethyl-butyric acid
abietic acid
dehydroabietic acid
dihydroabietic acid In this respect also can be used mixtures of the above and equivalent salts of other neoacids including other saturated and unsaturated aliphatic and cycloaliphatic neoacids which may be further substituted with conventional inert substituents such as halogen, nitro and the like. Preferably I employ a basic plumbous salt of an aliphatic neoacid, containing up to 20 carbon atoms. Basic plumbous 2,2-dimethyl octanoate readily available as a solution in mineral spirits provides an especially good result.

The amount and nature of the organic polyol, the organic polyisocyanate and the filler to be employed in preparing the compositions of the invention can be varied over a wide range.

Suitable polyols for preparing the polyol compositions and noncellular urethanes of the invention include simple liquid polyols such as ethylene glycol or glycerol as well as polymeric liquid polyols such as polyester polyols and polyoxyalkylene ether polyols. Preferably the polyol is a polyoxyalkylene ether having a molecular weight between about 130 and 5600 and especially about 750 to 4500. The preferred polyols correspond essentially to the formula:

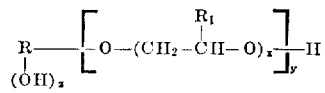

where R is the residue of a polyol as exemplified below, $R_1$ is hydrogen or methyl, $x$ is an integer from 1 to about 70, $y$ is an integer 1 to 6 and $z$ is an integer 0 to 5, with the proviso that when $y$ is 1, $z$ is at least 1.

Such polyether polyols can be obtained by condensation of an alkylene oxide such as ethylene oxide, 1,2-propylene oxide, etc., with glycerol, trimethylolpropane, 1,2,6-hexanetriol, pentaerythritol, α-methyl glucoside, sucrose, or mixtures thereof in the presence of catalysts such as trialkylamines, such as trimethylamine, or inorganic bases, such as potassium hydroxide, or a metal halide, such as boron trifluoride. Polyether polyols which are derived from 1,2-propylene oxide and mixtures of diols and triols or of diols and tetrols are especially useful.

Typical liquid organic polyisocyanates suitable for preparing the novel filled non-cellular urethane elastomers of the invention include the following:

Aliphatic polyisocyanates:
    hexamethylene diisocyanate
    pentamethylene diisocyanate Cycloaliphatic polyisocyanates:
    cyclohexyl 2,4-diisocyanate
    4,4'-methylene-bis(cyclohexyl isocyanate)

Aromatic polyisocyanates:
- 2,4-toluene diisocyanate
- 2,6-toluene diisocyanate
- 4,4-methylene-bis(phenyl isocyanate)
- 1,5-naphthalene diisocyanate
- 4,4',4''-triphenylmethane triisocyanate polyalkylene polyaryl polyisocyanates disclosed in U.S. Pat. 2.683.730

Isocyanate-terminated urethane prepolymers, in other words reaction products of an excess of a diisocyanate such as any of those given above with a polyol such as trimethylol propane or polyalkylene ether polyols of the type mentioned above, as well as isocyanate polymers of diisocyanates can be used also in place of the polyisocyanates noted above. Preferably the organic polyisocyanate reactant is an isocyanate-terminated urethane prepolymer.

The preferred urethane elastomers of the invention contain a cross-linked structure. To produce such cross-linking it is desirable to employ a polyol and/or a polyisocyanate reactant functionality greater than 2 and especially about 2.1 to 2.7.

The proportions of organic polyisocyanate and polyol employed in the polyurethane-forming reaction can be varied somewhat depending upon the particular characteristics of the noncellular urethane product desired. In general a proportion of polyisocyanate and polyol sufficient to provide a ratio of isocyanato to hydroxyl-groups of at least about 0.9:1 should be used. In preparing urethane elastomers according to a preferred embodiment of the invention a proportion corresponding to a ratio of NCO:OH of between about 1.0 to 1.4:1 is used.

In preparing filled elastomers according to a particular embodiment of the invention the filler charged to the urethane-forming reaction mixture is a conventional finely divided inorganic material designated in this art as "inert." In preparing filled elastomers useful as sealants for ceramic sewage pipes and the like it is desirable that the fillers used be resistant to sewage and soil micro-organisms. Typical examples of suitable fillers include:

Nonhydrophobic fillers:
 attapulgite
 kaolin
 talc
 bentonite
 halloysite
 aluminum silicate
 calcium silicate
 magnesium trisilicate
 zinc sulfide
 barium sulfate
 calcium fluoride
 titanium dioxide
 amorphous silica Hydrophobic fillers:
 Kaophobe-45 (a surface modified hydrophobic aluminum silicate manufactured by the Georgia Kaolin Co.)
 hydrophobic inorganic powders disclosed in U.S. Pat. 3,334,062.

The above nonhydrophobic fillers may and usually do contain moisture such as water of crystallization in amounts of about 10–15 weight percent. Both hydrophobic and nonhydrophobic fillers contain adsorbed moisture in amounts of about 1 or more percent based on the weight of the filler.

Fillers devoid of water of crystallization which can be obtained by calcining hydrated fillers can be used in the present novel compositions. However the uncalcined fillers are advantageously employed since they generally provide sealant compositions of improved resistance to acids. Urethane compositions of especially good hydrolytic stability are obtained according to the present invention by employing a hydrophobic filler such as Kaophobe-45 or the fillers disclosed in U.S. Pat. 3,334,062.

The amount of filler charged is not critical and can be varied over a broad range. The amount used will depend to a considerable extent upon the particular properties and characteristics desired in the final urethane product. Advantageously the filler is added in amounts of between about 25 and 150% by weight of the polyol component, corresponding to between about 10% and about 60% filler based on the weight of the total reaction mixture.

The improved process of the invention provides compositions which gel and cure rapidly even at ambient temperature in the presence of moisture to hot water-stable, microorganism-resistant noncellular polyurethanes. Hence the invention permits in situ production of completely reacted urethane coatings, caulks and sealants on cloth, leather, paper and ceramics. These polyurethanes being stable to contact with water at 60° C. or higher temperature are particularly useful in sealing and caulking ceramic sewer pipes conveying hot aqueous liquids.

The more detailed practice of my invention will be illustrated by the following examples in which parts and percentages are by weight unless otherwise noted and temperatures are in degrees centigrade.

EXAMPLE 1

Part A.—Preparation of polyisocyanate component (NCO-terminated urethane prepolymer) 69 parts of a mixture of about 80% 2,4-toluene diisocyanate and about 20% 2,6-toluene diisocyanate are heated to 50°. Over a period of about 30 minutes, 31 parts of a 1,2-propylene glycol based 1,2-propylene oxide polyether (hydroxyl number, 380, equivalent weight 147) is charged to the toluene diisocyanate with agitation, the mixture being maintained at about 70° during the addition. On completion of the addition, the reaction mass is agitated at about 70° for two hours and cooled to ambient temperature. The resultant isocyanate-terminated urethane prepolymer has the following characteristics:

Amine equivalent _____ 171
Percent free NCO _____ 24.5
Percent unreacted toluene diisocyanate _____ 25.4

Part B.—Preparation of polyether polyol component stock

To a mixture (1500 parts) of an α-methyl gluco-side-based 1,2-propylene oxide-extended polyether polyol and a 1,2-propylene glycol-based 1,2-propylene oxide-extended polyether polyol having the following characteristics:

Hydroxyl number _____ 76
Average equivalent weight _____ 737
Average functionality _____ 2.46 are charged 1250 parts of a filler consisting of uncalcined aluminum silicate containing about 1% adsorbed water (Hydrite Flat D, Georgia Kaolin Co.), 10.5 parts of mercuic acetate (0.7% based on the weight of the polyol mixture) and 10 parts of a solution of basic plumbous 2,2-dimethyl octanoate in mineral spirits (Lead Ten-Cem; Mooney Chemical Co., corresponding to about 2.4 parts metallic lead or about 0.16% lead based on the polyol mixture).

The mixture is agitated in a high shear mixer (Cowles dissolver, Morehouse Cowles Co.) for 10 minutes. The resulting warm (60°–70°) dispersion is cooled to ambient temperature.

Part C.—Preparation of urethane elastomer

A 0.1 aliquot of the polyol-filler stock of Part B is mixed with an amount (about 38.3 parts) of the polyisocyanate prepolymer of Part A above to provide a mixture having an isocyanato group to hydroxyl group ratio of 1.1:1. This mixture is agitated for 30 to 60 seconds at ambient temperature (22°±3°) and allowed to stand for three days at ambient temperature to insure complete curing. The resultant noncellular elastomeric solid which has a hardness of 75 (as measured on the A scale of a Shore durometer, Shore Instrument and Mfg. Co., Inc.) is immersed in a bath of distilled water maintained at about 60°. The retention of hardness (corresponding to 75% of the initial hardness) by the elastomer after immersion for 30 days as reported in the table below is indicative of the excellent hydrolytic stability of the polymer.

EXAMPLE 2

A noncellular urethane elastomer is prepared substantially as described in Example 1 except that the polyether polyol component stock is prepared using only 5 parts of the mineral spirits solution of basic plumbous 2,2-dimethyl octanoate (corresponding to 1.2 parts lead or 0.08% lead based on the polyol mixture charged). The hydrolytic stability of the resultant cured elastomer (initial hardness 76) is tested by immersion in hot water substantially as described in Example 1, Part C. The results of this experiment are compared with those of Example 1 in the table below.

The following Comparative Examples 3 through 6 illustrate attempts to prepare noncellular filled urethanes employing metal additives other than those prescribed by the invention.

EXAMPLE 3

A urethane elastomer is prepared substantially as described in Example 1 except that the polyether polyol stock is prepared employing 10.5 parts of phenyl mercuric propionate ("Metasol 57" Metal Salt Corp., 0.7% based on the polyol mixture charged) instead of mercuric acetate and 2.5 parts of magnesium oxide (0.17% based on the polyol mixture) instead of the lead neocarboxylate salt solution. The hydrolytic stability of the resultant noncellular filled urethane elastomer (initial hardness of 76) is determined substantially as described in Example 1, Part C. The results of this experiment are reported in the table below.

EXAMPLE 4

A urethane elastomer is prepared substantially as described in Example 2 except that polyether polyol stock is prepared employing 10.5 parts of the organomercuric salt of Example 3 instead of mercuric acetate. The hydrolytic stability of the resulting noncellular filled urethane elastomer (initial hardness, 75) is determined substantially as previously described. The results of this experiment are presented in the table below.

EXAMPLE 5

A urethane elastomer is prepared substantially as described in Example 1 except that the polyether polyol stock is prepared employing 2.5 parts magnesium oxide in place of the lead neocarboxylate salt solution. The hydrolytic stability of the resultant noncellular filled elastomer (initial hardness 76) is determined as previously described. The results of this experiment are compared with the results of the previous examples in the table below.

EXAMPLE 6

The procedure of Example 1 is repeated substantially as described omitting the plumbous basic neocarboxylate salt solution. The mixture of polyisocyanate and polyether polyol components which is obtained remains liquid after standing for three days at ambient temperature and hence cannot be tested for hydrolytic stability. This result is also included in the table below. The nongelation of the composition illustrates the low activity of mercuric carboxylate catalyst in the absence of a basic divalent lead neoacid salt.

TABLE

| Example | Metallic additives | | Hardness [1] after curing and subsequent immersion in water at 60° C. for— | | | | | |
|---|---|---|---|---|---|---|---|---|
| | Mercuric salt catalyst | Alkaline promoter | 0 days | 3 days | 7 days | 10 days | 15 days | 30 days |
| 1 | 1.05 parts mercuric acetate | 1 part of a mineral spirits solution of basic plumbous 2,2-dimethyl octanoate containing 24% lead. | 75 | 70 | 65 | 63 | 63 | 56 |
| 2 | As in Example 1 | 0.5 part of the additive solution of Example 1 | 76 | 60 | 53 | 52 | 47 | 41 |
| 3 | 1.05 parts of phenyl mercuric propionate. | 0.25 part of magnesium oxide | 76 | 45 | 7 | (2) | (2) | (2) |
| 4 | As in Example 3 | As in Example 2 | 75 | 57 | 37 | 25 | 15 | (2) |
| 5 | As in Example 1 | As in Example 3 | 76 | 63 | 44 | 35 | 27 | (2) |
| 6 | do | None | Liquid | (2) | (2) | (2) | (2) | (2) |

[1] In units of the A scale, Shore Durometer.
[2] Product is not further tested when its hardness drops to less than about 25 to 30.

I claim:

1. In the preparation of a noncellular polyurethane by liquid phase reaction of an organic polyisocyanate and an organic polyol at ambient temperature and pressure in the presence of a dissolved mercuric carboxylate catalyst promoted with a basic plumbous carboxylate, the improvement which consists in employing as the catalyst a mercuric carboxylic acid salt which is devoid of mercury bound directly to carbon and in employing as the promoter a basic plumbous salt of a carboxylic acid having a carbon attached to a carboxylic acid group and bound by single covalent bonds to each of four carbon atoms.

2. A process as defined in claim 1 wherein the amount of mercuric catalyst is from about 0.01 to about 5 weight percent of the organic polyol.

3. A process as defined in claim 2 wherein the amount of mercuric catalyst is about 0.05 to 2 weight percent of the organic polyol.

4. A process as defined in claim 1 wherein the amount of basic plumbous salt promoter corresponds to from about 0.05 to about 2 percent lead based on the weight of the organic polyol.

5. A process as defined in claim 4 wherein the amount of basic plumbous salt promoter corresponds to about 0.08 to 2 percent lead based on the weight of the organic polyol.

6. A process as defined in claim 1 wherein an inert filler is charged to the reaction mass.

7. A process as defined in claim 1 wherein the mercuric catalyst is a mercuric salt of an aliphatic carboxylic acid of 1 to 20 carbon atoms.

8. A process as defined in claim 7 wherein the mercuric catalyst is a mercuric salt of an alkanoic acid of one to six carbon atoms.

9. A process as defined in claim 1 wherein the basic plumbous promoter is a basic plumbous salt of an aliphatic acid containing up to 20 carbon atoms.

10. A process as defined in claim 1 wherein the organic polyol is a polyalkylene ether polyol.

11. A process as defined in claim 10 wherein the polyalkylene ether polyol has a molecular weight between about 130 and 5600.

12. A process as defined in claim 1 wherein the organic polyol has a functionality greater than 2.

13. A process as defined in claim 1 wherein the organic polyisocyanate is an isocyanate-terminated urethane prepolymer.

14. A process as defined in claim 1 wherein the organic polyisocyanate has a functionality greater than 2.

15. A process as defined in claim 1 wherein the proportion of organic polyisocyanate and organic polyol charged is sufficient to provide a ratio of isocyanato to hydroxyl groups of at least about 0.9:1.

16. An organic polyol composition for use in the preparation of polyurethanes which contains a liquid organic polyol, a dissolved catalyzing amount of a mercuric carboxylic acid salt which is devoid of mercury bound directly to carbon and a dissolved promoting amount of a basic plumbous salt of a carboxylic acid having a carbon atom attached to a carboxylic acid group and bound by single covalent bonds to each of four carbon atoms.

17. An organic polyol composition as defined in claim 16 which contains a dispersed inert filler.

18. A hot water stable noncellular urethane prepared in accordance with the process as defined in claim 1.

19. A process as defined in claim 13 wherein the isocyanate-terminated urethane prepolymer is the difunctional reaction product of a mixture of about 80 weight present 2,4-toluene diisocyanate and about 20 weight percent 2,6-toluene diisocyanate and a 1,2-propylene glycol-based 1,2-propylene oxide-extended polyether polyol having a molecular weight of about 560, the organic polyol is a mixture of an α-methyl glucoside-based 1,2-propylene oxide-extended polyether polyol and a 1,2-propylene glycol-based, 1,2-propylene oxide-extended polyether polyol said mixture having an average molecular weight of about 1810 and an average functionality of about 2.46 the amount of prepolymer and organic polyol being sufficient to provide a ratio of isocyanate to hydroxyl groups of at least about 0.9:1, the mercuric salt catalyst is mercuric acetate amounting to from about 0.01 to about 5 weight percent of the organic polyol, the basic plumbous salt promoter is basic plumbous 2,2-dimethyl octanoate charged in an amount corresponding to from about 0.05 to about 2 weight percent lead based on the weight of the organic polyol and the reaction mass contains as inert filler about 10 to 60 weight percent aluminum silicate containing at least about one weight percent absorbed water.

20. A hot water stable filled noncellular polyurethane prepared in accordance with the process as defined in claim 19.

References Cited
UNITED STATES PATENTS

| | | | |
|---|---|---|---|
| 3,347,804 | 10/1967 | Buckley | 260—2.5 |
| 3,385,807 | 5/1968 | Herdlein et al. | 260—2.5 |
| 3,395,108 | 7/1968 | Cobbledick et al. | 260—18 |
| 3,419,509 | 12/1968 | Willett | 260—18 |
| 3,470,121 | 9/1969 | Cobbledick | 260—18 |

DONALD E. CZAJA, Primary Examiner

H. S. COCKERAM, Assistant Examiner

U.S. Cl. X.R.

252—182; 260—37 N